United States Patent
Mochizuki

(10) Patent No.: US 7,333,812 B2
(45) Date of Patent: Feb. 19, 2008

(54) TRANSMISSION POWER CONTROL METHOD, RECEIVING METHOD, MOBILE COMMUNICATIONS SYSTEM AND MOBILE TERMINAL

(75) Inventor: Takashi Mochizuki, Tokyo (JP)

(73) Assignee: NEC Corporation, Tokyo (JP)

( * ) Notice: Subject to any disclaimer, the term of this patent is extended or adjusted under 35 U.S.C. 154(b) by 351 days.

(21) Appl. No.: 10/020,130

(22) Filed: Dec. 18, 2001

(65) Prior Publication Data

US 2002/0082038 A1 Jun. 27, 2002

(30) Foreign Application Priority Data

Dec. 25, 2000 (JP) .............................. 2000-392351

(51) Int. Cl.
*H04Q 7/20* (2006.01)
(52) U.S. Cl. ...................... 455/442; 455/69; 455/522; 370/331
(58) Field of Classification Search ........ 455/436–444, 455/522, 69; 370/331–334
See application file for complete search history.

(56) References Cited

U.S. PATENT DOCUMENTS

| | | | | |
|---|---|---|---|---|
| 6,334,047 B1 * | 12/2001 | Andersson et al. | ............ | 455/69 |
| 6,414,947 B1 * | 7/2002 | Legg et al. | ................. | 370/331 |
| 6,553,016 B1 * | 4/2003 | Roxbergh | .................... | 370/331 |
| 6,603,971 B1 * | 8/2003 | Mohebbi | ..................... | 455/437 |
| 6,628,958 B1 * | 9/2003 | Kamel et al. | ............... | 455/522 |
| 6,650,905 B1 * | 11/2003 | Toskala et al. | ............. | 455/522 |
| 6,862,275 B1 * | 3/2005 | Dabak | ........................ | 370/342 |

FOREIGN PATENT DOCUMENTS

| | | |
|---|---|---|
| EP | 0 936 751 A1 | 8/1999 |
| JP | 11-69416 | 3/1999 |
| JP | 11-191896 | 7/1999 |
| JP | 11-308657 | 11/1999 |

OTHER PUBLICATIONS

3rd Generation Partnership Project; Technical Specification Group Radio Access Network; Physical layer procedures (3G TS 25.214 v 3.1.1).*
"Universal Mobile Telecommunications System (UMTS); Physical Layer Procedures (FDD) 3GPP TS 25.214 Version 3.4.0 Release 1999", Sep. 2000, pp. 1-48.

* cited by examiner

*Primary Examiner*—Edward F. Urban
*Assistant Examiner*—Raymond S. Dean
(74) *Attorney, Agent, or Firm*—Sughrue Mion, PLLC

(57) ABSTRACT

During soft handover, base station selector 22 selects the base station that is transmitting the downlink signal with the best downlink reception quality, and notifies the base stations of the ID of this base station, so as to cause only the selected base station to transmit user data. Downlink signal weight decision circuit 23 estimates base stations that have a likelihood of transmitting user data. Downlink TPC command decision circuit 25 uses the downlink signal from the base stations that have a likelihood of transmitting user data, to decide whether the transmission power of the base stations is excessive or insufficient, and to instruct the base stations to increase or decrease their transmission power. Data demodulator 27 uses the downlink signals from base stations that have a likelihood of transmitting user data to demodulate the user data.

24 Claims, 8 Drawing Sheets

TRANSMISSION POWER CONTROL METHOD, RECEIVING METHOD, MOBILE COMMUNICATIONS SYSTEM AND MOBILE TERMINAL

BACKGROUND OF THE INVENTION

1. Field of the Invention

The present invention relates to code division multiple access (CDMA) mobile communications systems, and in particular to a method of utilizing the downlink signal that is received by a mobile terminal in a CDMA mobile communications system.

2. Description of Related Art

In a CDMA mobile communications system, the transmission power used by base stations is controlled so that the power of the radio wave transmitted from base stations to mobile terminals is kept as low as possible, while maintaining constant channel quality.

A conventional transmission power control method with base station selection in a wideband CDMA mobile communications system will now be described with reference to FIG. 9, which is a conceptual diagram aiding a general explanation of such a transmission power control method.

A CDMA mobile communications system comprises a plurality of base stations and a plurality of mobile terminals. FIG. 9 shows two base stations 91 and 92, and one mobile terminal 93, of such a CDMA mobile communications system.

It is herein assumed that mobile terminal 93 is in the soft handover state and is communicating with base stations 91 and 92 simultaneously.

Mobile terminal 93 measures the propagation characteristics of the common pilot channel (CPICH) transmitted by the base stations and discerns which of the base stations gives the better common pilot channel propagation characteristics. Mobile terminal 93 then notifies the base stations of the ID of this base station.

The base station specified by the ID sent from mobile terminal 93 transmits downlink data to mobile terminal 93 using the dedicated physical data channel (DPDCH). The base station that has not been specified does not transmit downlink data to terminal 93.

Base stations 91 and 92 transmit control signals to mobile terminal 93 using the dedicated physical control channel (DPCCH), irrespective of whether or not the base station has been specified by the base station ID sent from mobile terminal 93.

Mobile terminal 93 transmits to base stations 91 and 92, in addition to a base station ID, a transmission power control (TPC) command that instructs an increase or decrease in the transmission power of the downlink dedicated physical channels (DPCCH and DPDCH).

Base stations 91 and 92 increase or decrease the transmission power of the downlink dedicated physical channels in accordance with the instructions given by the TPC command from mobile terminal 93.

FIG. 10 gives an example of the signal format of the dedicated physical channels in the downlink, while FIG. 11 gives an example of the signal format of the dedicated physical channels in the uplink.

In the downlink signal format illustrated in FIG. 10, the dedicated physical control channel and the dedicated physical data channel are time division multiplexed. Each slot is a fixed time length signal containing a field for the dedicated physical control channel and a field for the dedicated physical data channel.

In the uplink signal format illustrated in FIG. 11, the dedicated physical control channel and the dedicated physical data channel are quadrature modulated and multiplexed as mutually orthogonal signal components. Like the downlink slots, each uplink slot is a fixed time length signal.

A pilot signal, a feedback information (FBI) signal and a TPC signal are time multiplexed in the uplink dedicated physical control channels.

Mobile terminal 93 uses the FBI signal over a number of slots to notify base stations 91 and 92 of a base station ID.

FIG. 12 is a block diagram showing an example of the constitution of mobile terminal 93.

Mobile terminal 93 comprises antenna 121, circulator 122, base station selector 123, downlink reception quality measuring circuit 124, downlink TPC command decision circuit 125, multiplexer 126 and data demodulator 127.

Antenna 121 receives downlink signals from the base stations and transmits an uplink signal to base station 91 or 92.

Circulator 122 inserts the downlink signals received by antenna 121 into mobile terminal 93 and supplies antenna 121 with the uplink signal for transmission to the base station.

Base station selector 123 measures, for each base station, the propagation loss experienced by the downlink signal and selects, from the plurality of base stations, the one giving the smallest propagation loss.

Downlink reception quality measuring circuit 124 measures the reception quality of the downlink signal from the base station selected by base station selector 123.

On the basis of the reception quality measured by downlink reception quality measuring circuit 124, downlink TPC command decision circuit 125 decides whether the transmission power of the base station should be increased or decreased, and outputs the result of this decision as a TPC command. For example, downlink TPC command decision circuit 125 outputs a TPC command for instructing the base station to increase its transmission power when the reception quality is below a prescribed threshold, and to decrease its transmission power when the reception quality is above the threshold.

Multiplexer 126 multiplexes the uplink data that is input from terminal 128, the base station ID that is input from base station selector 123, and the TPC command that is input from downlink TPC command decision circuit 125. Multiplexer 126 outputs the multiplexed signal to circulator 122 as the uplink signal for transmission to the base station.

Data demodulator 127 demodulates the downlink data from the downlink signal of the base station that has been specified by base station selector 123, and outputs the demodulated data from terminal 129.

FIG. 13 is a block diagram showing an example of the constitution of downlink reception quality measuring circuit 124.

Downlink reception quality measuring circuit 124 comprises matched filter 131 and signal-to-interference ratio (SIR) measuring circuit 132.

Matched filter 131 demodulates the signal of the base station specified by base station selector 123.

SIR measuring circuit 132 measures and outputs the signal-to-interference power ratio of the output signal from matched filter 131.

FIG. 14 is a block diagram showing an example of the constitution of data demodulator 127.

Matched filter 141 demodulates the signal of the base station specified by base station selector 123.

Error-correcting decoder 142 performs error correction and decoding of the output signal of matched filter 141, thereby decoding the downlink data.

FIG. 15 serves to explain the transmission power control for the downlink dedicated physical channels.

In mobile terminal 93, downlink reception quality measuring circuit 124 uses the signal in the dedicated physical control channel (DPCCH) contained in the downlink signal received from the base station to measure reception quality, and uses downlink TPC command decision circuit 125 to decide which TPC command to give.

The TPC command is transmitted as a TPC signal in the uplink dedicated physical control channel.

The base station receives the TPC signal from mobile terminal 93 and, in accordance with the instruction given by the TPC command, either increases or decreases the transmission power of the downlink dedicated physical channel on a slot-by-slot basis.

FIG. 16 serves to explain transmission control by base station selection using base station ID. The explanation will be given in terms of the two base stations 91 and 92 and the mobile terminal 93 depicted in FIG. 9.

Firstly, mobile terminal 93 uses a plurality of FBI signals in the uplink dedicated physical control channel to notify base stations 91 and 92 of the base station ID selected by base station selector 123. The base station ID is encoded to make it less susceptible to transmission path error.

When base stations 91 and 92 receive the information contained in the final slot employed to convey the base station ID, they decide, on the basis of the received base station ID, whether or not to transmit over the dedicated physical data channel (DPDCH) after a prescribed number of slots. Namely, the base station specified by the received base station ID (in the example illustrated in FIG. 16, base station 92) transmits over the DPDCH, while the base station that has not been specified (in this case, base station 91) does not transmit over the DPDCH.

However, for both base stations 91 and 92, the decision not to transmit the DPDCH can only be made when the reception quality of the signal bearing the base station ID is sufficiently good. This makes it possible to avoid the situation where, due to transmission error, neither of the base stations transmits the DPDCH.

Base stations 91 and 92 always transmit the dedicated physical control channel (DPCCH) regardless of which base station ID is specified. Consequently, although the DPCCH may be received from a number of base stations, mobile terminal 93 decides which TPC command to send by looking at the DPCCH received from the base station that is transmitting in the DPDCH. Because a TPC command serves to control transmission power in the DPDCH, it is necessary to look at the DPCCH from the base station that is transmitting the DPDCH.

However, the following problem is encountered in a conventional transmission power control method with base station selection.

Namely, if the propagation environment for the uplink signal is poor and a base station cannot receive the base station ID from mobile terminal 93 correctly, a base station other than the one specified by mobile terminal 93 may transmit downlink data. If this occurs, the downlink data from the unintended base station constitutes an interfering wave with respect to the other downlink signal.

Data demodulator 127 of mobile terminal 93 demodulates downlink data using only the downlink signal received from the base station that was specified in terms of its base station ID, in other words, using only the downlink signal received from the base station that was instructed to transmit downlink data. Consequently, an error in the transmission of the base station ID will result in none of the downlink data transmitted from unintended base stations being utilized, and hence in a decrease in frequency utilization efficiency.

SUMMARY OF THE INVENTION

It is an object of the present invention to provide a mobile communications system capable of making effective use of downlink data transmitted from base stations when the propagation environment for uplink signals is poor.

To achieve this object, the transmission power control method of this invention controls the transmission power of downlink signals from base stations to a mobile terminal in a mobile communications system, and comprises steps of:

during soft handover, sending notification, from the mobile terminal to the base stations, of the ID of the base station that is transmitting the downlink signal with the best downlink reception quality;

stopping transmission of user data to the mobile terminal from base stations that do not correspond to the base station ID notified by the mobile terminal;

estimating, at the mobile terminal, which base stations have a likelihood of transmitting user data;

using the downlink signals from these base stations that have a likelihood of transmitting user data, to decide, at the mobile terminal, whether the transmission power of these base stations is excessive or insufficient;

sending information, from the mobile terminal to these base stations, relating to excess or deficiency of their transmission power; and increasing or decreasing the transmission power of these base stations in accordance with this information from the mobile terminal relating to excess or deficiency of their transmission power.

Consequently, because the downlink signals from base stations that have been estimated to have a likelihood of transmitting user data are used to control downlink transmission power, even user data transmitted from base stations that were not selected can be utilized for controlling transmission power when, due to poor uplink reception quality, the base station ID communicated from the mobile terminal has been erroneously received and user data has been transmitted from a base station that the mobile terminal did not select.

According to this aspect of the invention, the base stations that have a likelihood of transmitting user data are estimated from the estimated uplink reception quality.

According to this aspect of the invention, base stations that are estimated to have a likelihood of transmitting user data are base stations at which the estimated uplink reception quality is not good.

According to this aspect of the invention, the estimated uplink reception quality is calculated from the correlation between the increase or decrease in transmission power instructed by the transmission power control, and the increase or decrease in the power of the downlink signal received from the base stations.

According to this aspect of the invention, the signal obtained by combining the weighted downlink signals from the base stations that have a likelihood of transmitting user data is used for deciding whether the transmission power of the base stations is excessive or insufficient.

The receiving method of this invention demodulates user data in the downlink signal from base stations to a mobile terminal in a mobile communications system, and comprises steps of:

during soft handover, sending notification, from the mobile terminal to the base stations, of the ID of the base station that is transmitting the downlink signal with the best downlink reception quality;

stopping transmission of user data to the mobile terminal from base stations that do not correspond to the base station ID notified by the mobile terminal;

estimating, at the mobile terminal, which base stations have a likelihood of transmitting user data; and using the downlink signal from these base stations that have a likelihood of transmitting user data, to demodulate, at the mobile terminal, the user data. Consequently, because base stations that have a likelihood of transmitting user data are estimated and downlink data demodulated using the downlink signals from these base stations, even user data transmitted from base stations that were not selected is utilized for demodulation of downlink data when, due to poor uplink reception quality, the base station ID notified by the mobile terminal has been erroneously received and user data has been transmitted from a base station that the mobile terminal did not select.

According to this aspect of the invention, base stations that have a likelihood of transmitting user data are estimated from the estimated uplink reception quality.

According to this aspect of the invention, base stations that are estimated to have a likelihood of transmitting user data are base stations at which the estimated uplink reception quality is not good.

According to this aspect of the invention, the estimated uplink reception quality is calculated from the correlation between the increase or decrease in transmission power instructed by the transmission power control, and the increase or decrease in the power of the downlink signal received from the base stations.

According to this aspect of the invention, the signal obtained by combining the weighted downlink signals from the base stations that have a likelihood of transmitting user data is used for demodulating the user data.

The mobile communications system of the invention controls the transmission power of the downlink signal, and comprises:

a plurality of base stations, whereof a base station:

a) transmits user data when the base station ID that the base station has received as a notification corresponds to its own ID;

b) stops transmitting user data when the base station ID does not correspond to its own ID; and c) increases or decreases its transmission power in accordance with notified information regarding excess or deficiency of its transmission power;

and also comprises:

at least one mobile terminal which, during soft handover:

i) notifies the base stations of the ID of the base station that is transmitting the downlink signal with the best downlink reception quality;

ii) estimates which base stations have a likelihood of transmitting the user data;

iii) uses the downlink signals from the base stations so estimated to decide whether the transmission power of the base stations is excessive or insufficient; and iv) sends information to the base stations informing them that their transmission power is excessive or insufficient.

According to this aspect of the invention, the mobile terminal uses the signal obtained by combining weighted downlink signals from the estimated base stations, to decide whether the transmission power of the base stations is excessive or insufficient.

Another mobile communications system of this invention controls the transmission power of the downlink signal, and comprises:

a plurality of base stations, whereof a base station:

a) transmits user data when the base station ID that the base station has received as a notification corresponds to its own ID; and b) stops transmitting user data when the base station ID does not correspond to its own ID;

and also comprises:

at least one mobile terminal which, during soft handover:

i) notifies the base stations of the ID of the base station that is transmitting the downlink signal with the best downlink reception quality;

ii) estimates which base stations have a likelihood of transmitting the user data; and iii) uses the downlink signals from the base stations so estimated to demodulate the user data.

According to this aspect of the invention, the mobile terminal uses the signal obtained by combining weighted downlink signals from the estimated base stations, to demodulate the user data.

According to this aspect of the invention, the mobile terminal estimates, from the estimated uplink reception quality, base stations that have a likelihood of transmitting user data.

According to this aspect of the invention, a base station which the mobile terminal estimates to have a likelihood of transmitting user data is a base station at which the estimated uplink reception quality is not good.

According to this aspect of the invention, the mobile terminal calculates the estimated uplink reception quality from the correlation between the increase or decrease in transmission power instructed by the transmission power control, and the increase or decrease in the power of the downlink signal received from the base stations.

A mobile terminal of this invention controls the transmission power of the downlink signals from base stations in a mobile communications system, and comprises:

base station selecting means for selecting, during soft handover, the base station that is transmitting the downlink signal with the best downlink reception quality, and for notifying the base stations of the ID of that base station, so as to cause only the selected base station to transmit user data;

downlink signal weight decision means for estimating base stations that have a likelihood of transmitting user data; and downlink TPC command decision means for using the downlink signals from base stations that have a likelihood of transmitting user data, to decide whether the transmission power of these base stations is excessive or insufficient, and to instruct an increase or decrease of this transmission power.

According to this aspect of the invention, the downlink TPC command decision means uses the signal obtained by combining the weighted downlink signals from the estimated base stations to decide whether the transmission power of the base stations is excessive or insufficient.

Another mobile terminal according to this invention receives user data in the downlink signal from base stations in a mobile communications system, and comprises:

base station selecting means for selecting, during soft handover, the base station that is transmitting the downlink signal with the best downlink reception quality, and for notifying the base stations of the ID of that base station, so as to cause only the selected base station to transmit user data;

downlink signal weight decision means for estimating base stations that have a likelihood of transmitting user data; and data demodulating means for using the downlink signals from the base stations that have a likelihood of transmitting user data, to demodulate the user data.

The data demodulating means uses the signal obtained by combining the weighted downlink signals from the estimated base stations to demodulate the user data.

According to this aspect of the invention, the downlink signal weight decision means estimates, from the estimated uplink reception quality, base stations that have a likelihood of transmitting user data.

According to this aspect of the invention, a base station that the downlink signal weight decision means estimates as having a likelihood of transmitting user data is a base station at which the estimated uplink reception quality is not good.

According to this aspect of the invention, the downlink signal weight decision means calculates the estimated uplink reception quality from the correlation between the increase or decrease in transmission power instructed by the transmission power control, and the increase or decrease in the power of the downlink signal received from the base stations.

BRIEF DESCRIPTION OF THE DRAWINGS

Specific embodiments of the present invention will now be described, by way of example only, with reference to the accompanying of drawings in which.

DETAILED DESCRIPTION OF THE PREFERRED EMBODIMENTS

An embodiment of the present invention will now be described in detail with reference to the drawings.

In the mobile communications system presupposed by this invention, a mobile terminal informs base stations of excess or deficiency of their transmission power. During soft handover, a mobile terminal also sends notification of the ID of the base station that gives the best downlink reception quality.

A base station increases or decreases its transmission power in accordance with information relating to excess or deficiency of this transmission power, this information being communicated from mobile terminals. In addition, a base station will stop transmitting user data to a mobile terminal when the base station ID communicated by the mobile terminal does not match the base station's own ID.

In the context of such a mobile communications system, the present invention takes reception error of the base station ID at base stations into consideration when deciding whether the transmission power of base stations is excessive or insufficient.

A CDMA mobile communications system according to a preferred embodiment of the invention will now be described.

Figure 1:
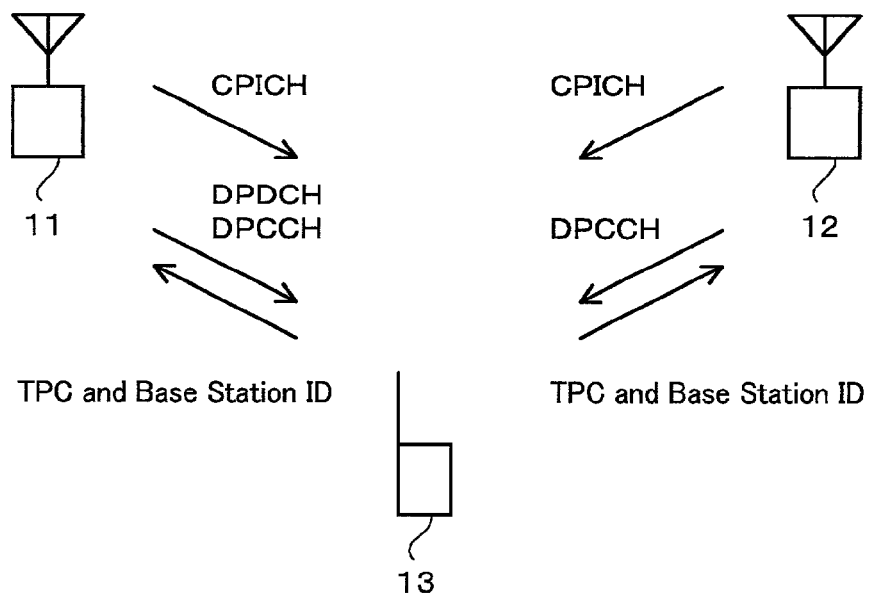
FIG. 1 is a conceptual diagram serving to explain a CDMA mobile communications system according to an embodiment of the present invention.

FIG. 1 is a conceptual diagram serving to explain the CDMA mobile communications system of this embodiment, which comprises a plurality of base stations and plurality of mobile terminals. FIG. 1 shows two base stations 11 and 12, and one mobile terminal 13, of the CDMA mobile communications system of the embodiment.

It is herein assumed that mobile terminal 13 is in the soft handover state and is communicating with base stations 11 and 12 simultaneously.

Mobile terminal 13 measures the propagation characteristics of the common pilot channel (CPICH) transmitted by base stations 11 and 12 and discerns which of the base stations gives the better common pilot channel propagation characteristics. Mobile terminal 13 then notifies base stations 11 and 12 of the ID of this base station.

The base station specified by the ID sent from mobile terminal 13 transmits downlink user data to mobile terminal 13 in the dedicated physical data channel (DPDCH). The base station that has not been specified does not transmit any signal to mobile terminal 13 in the dedicated physical data channel. In FIG. 1, only base station 11 transmits downlink user data.

Base stations 11 and 12 transmit control signals to mobile terminal 13 in the dedicated physical control channel (DPCCH), irrespective of whether or not the base station has been specified by the base station ID sent from mobile terminal 13.

Mobile terminal 13 transmits to base stations 11 and 12, in addition to a base station ID, a transmission power control (TPC) command that instructs an increase or decrease in the transmission power of the downlink dedicated physical channels (DPCCH and DPDCH).

Base stations 11 and 12 increase or decrease the transmission power of the downlink dedicated physical channels in accordance with the instructions given by the TPC command from mobile terminal 13.

Figure 10:
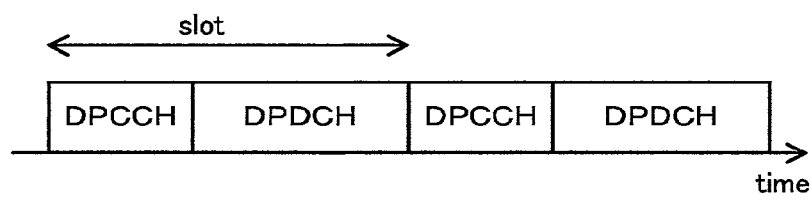
FIG. 10 gives an example of the signal format of the downlink dedicated physical channels in a CDMA mobile communications system.
Figure 11:
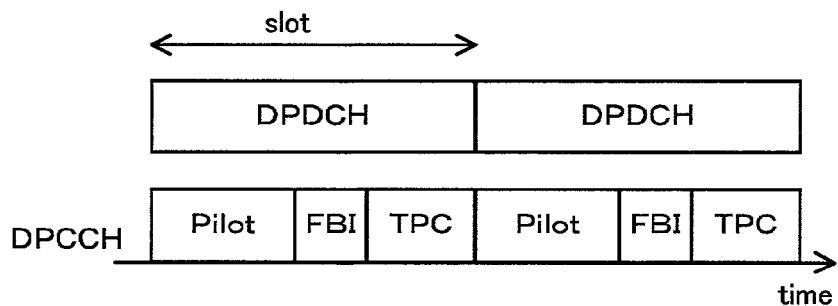
FIG. 11 gives an example of the signal format of the uplink dedicated physical channels in a CDMA mobile communications system.

The signal formats of both the uplink and downlink dedicated physical channels in this embodiment are the same as the conventional formats shown in FIG. 10 and FIG. 11.

In the downlink signal format illustrated in FIG. 10, the dedicated physical control channel and the dedicated physical data channel are time division multiplexed. Each slot is a fixed time length signal containing a field for the dedicated physical control channel and a field for the dedicated physical data channel.

In the uplink signal format illustrated in FIG. 11, the dedicated physical control channel and the dedicated physical data channel are quadrature modulated and multiplexed as mutually orthogonal signal components. Like the downlink slots, each uplink slot is a fixed time length signal.

A pilot signal, a feedback information (FBI) signal and a TPC signal are time multiplexed in the uplink dedicated physical control channels. Mobile terminal 13 uses the FBI signal over a number of slots to notify base stations 11 and 12 of a base station ID.

Figure 2:
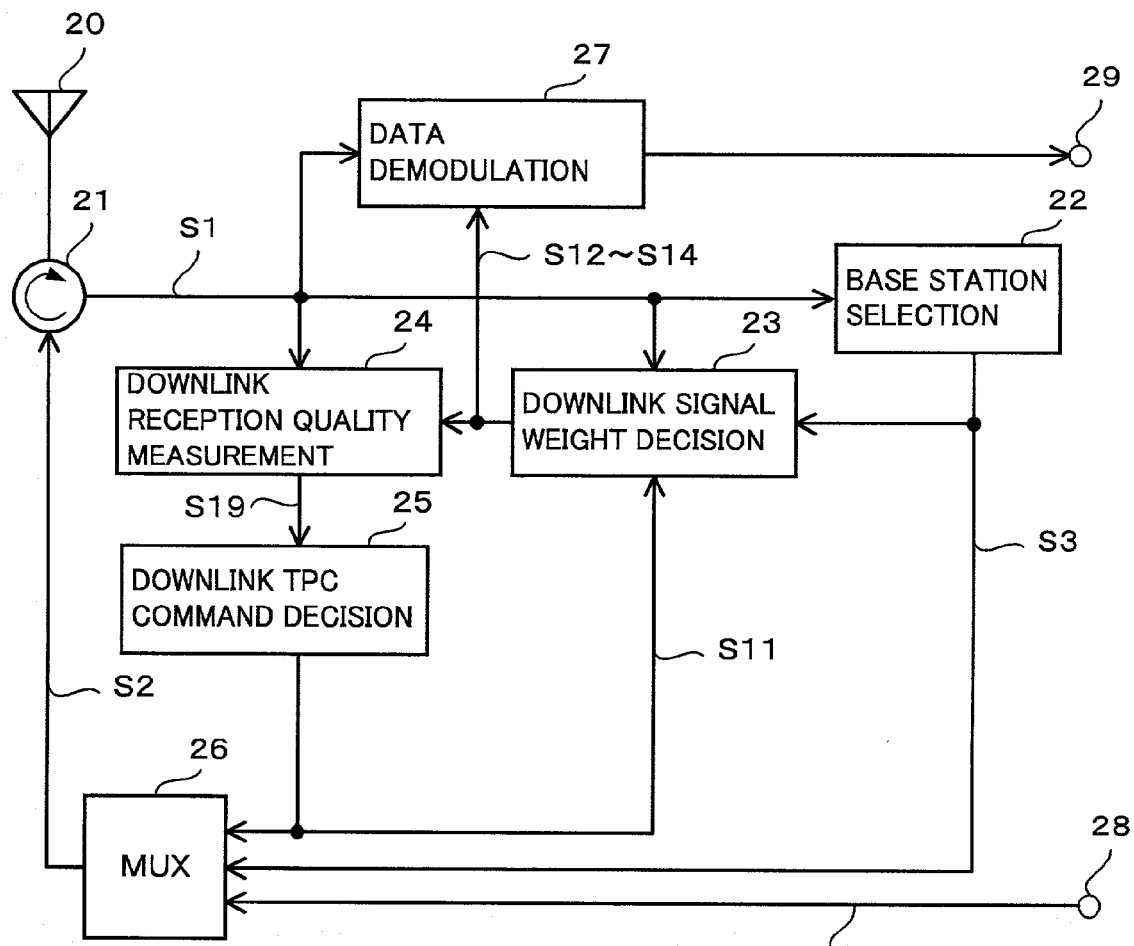
FIG. 2 is a block diagram showing an example of the constitution of the mobile terminal in this embodiment.

FIG. 2 is a block diagram showing an example of the constitution of mobile terminal 13 in this embodiment.

Mobile terminal 13 comprises antenna 20, circulator 21, base station selector 22, downlink signal weight decision circuit 23, downlink reception quality measuring circuit 24, downlink TPC command decision circuit 25, multiplexer 26 and data demodulator 27.

Antenna 20 receives downlink signals from base stations 11 and 12 and transmits an uplink signal to these base stations.

Circulator 21 inputs signal S1, received by antenna 20, to base station selector 22, downlink signal weight decision circuit 23, downlink reception quality measuring circuit 24 and data demodulator 27. Circulator 21 also supplies antenna 20 with signal S2 for transmission to the base stations.

On the basis of signal S1, base station selector 22 measures the propagation loss for each base station; selects, from the plurality of base stations, the one giving the smallest propagation loss; and inputs the ID of this base station to downlink signal weight decision circuit 23 and to multiplexer 26 as signal S3.

Downlink signal weight decision circuit 23 decides, in accordance with the likelihood with which each base station transmits downlink data, the weights to be applied to the signal received from each base station, taking into consideration the base station selected by base station selector 22. In other words, downlink signal weight decision circuit 23 estimates which base stations have a likelihood of transmitting downlink data and applies weights to these base stations in accordance with the degree of likelihood.

Figure 3:
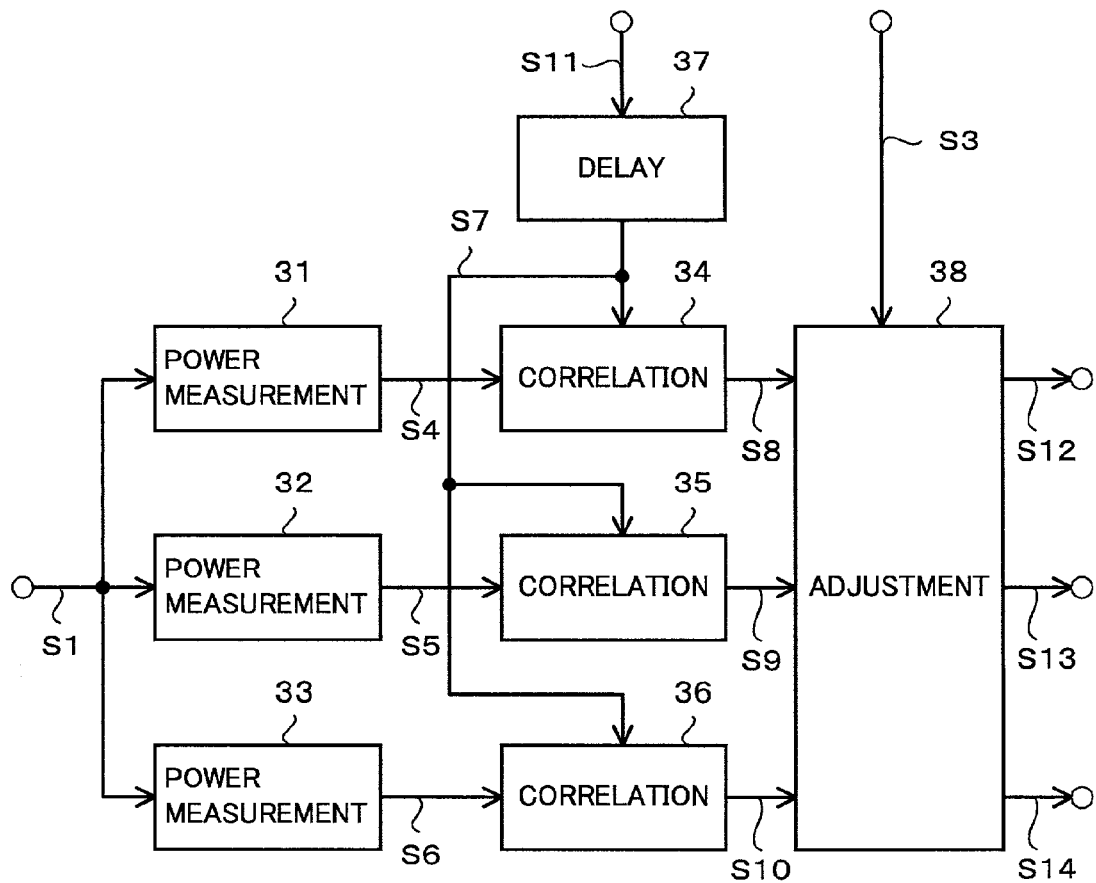
FIG. 3 is a block diagram showing the constitution of the downlink signal weight decision circuit in this embodiment.

Referring to FIG. 3, downlink signal weight decision circuit 23 comprises power measuring circuits 31, 32 and 33, correlators 34, 35 and 36, delay circuit 37 and adjustment circuit 38.

Power measuring circuits 31, 32 and 33 measure, from signal S1, the power of the signal received from the respective base stations, and apply, to the measured values of received signal power, corrections that take into account the propagation characteristics of the downlink channel. Power measuring circuits 31, 32 and 33 then respectively output signals S4, S5 and S6 indicative of the increase or decrease in transmission power.

Correlators 34, 35 and 36 calculate the correlations between output S7 of delay circuit 37 and signals S4, S5 and S6 input to the correlators from power measuring circuits 31, 32 and 33 respectively. Correlators 34, 35 and 36 input the results of these calculations to adjustment circuit 38 as signals S8, S9 and S10.

Delay circuit 37 delays the TPC command input from downlink TPC command decision circuit 25 as signal S11 by a time equivalent to one slot, and outputs the delayed command as signal S7.

Figure 4:
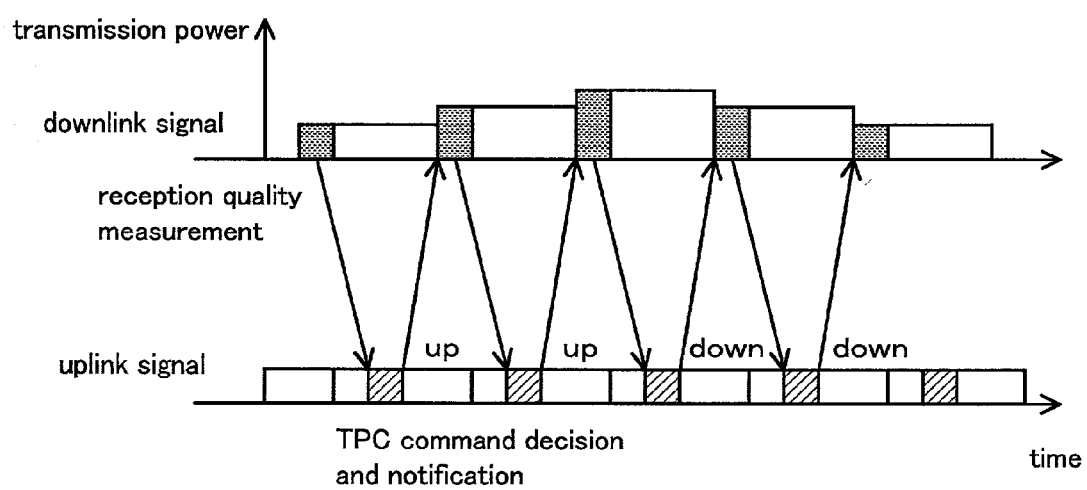
FIG. 4 is a timing chart illustrating the operation of downlink transmission power control in this embodiment.

Referring now to FIG. 4, mobile terminal 13 receives the downlink signal, measures the downlink reception quality, and uses the uplink signal to send to the base stations a TPC command for controlling the transmission power of the base stations, this TPC command having been decided on the basis of the measured downlink reception quality. Accordingly, as will be seen from FIG. 4, there is a correlation between the TPC command indicated by signal S7 and the increase or decrease in the transmission power of each base station indicated by signals S4, S5 and S6.

If reception quality for the uplink channel is ideal, the base stations increase or decrease their transmission power as instructed by the TPC command. However, the poorer the reception quality for the uplink channel is, the more the increase or decrease in transmission power diverges from that instructed by the TPC command. Consequently, the correlations indicated by signals S8, S9 and S10 indicate which of the base stations have correctly received the TPC command. In other words, these correlations show the estimated value of reception quality for the uplink channel (hereinafter called the estimated uplink reception quality).

In addition, the poorer the uplink reception quality is, the greater the likelihood that the base station ID will be incorrectly received by a base station becomes. Consequently, these correlations that show the estimated uplink reception quality also show the degree of likelihood that a base station will receive the base station ID incorrectly.

Adjustment circuit 38 looks at signals S8, S9 and S10 input from correlators 34, 35 and 36, and at signal S3 indicative of the base station selected by base station selector 22; decides, in accordance with the degree of likelihood with which the base stations transmit downlink data, the weight to be applied to each base station; and inputs these weights to downlink reception quality measuring circuit 24 and data demodulator 27 as signals S12, S13 and S14.

Figure 5:
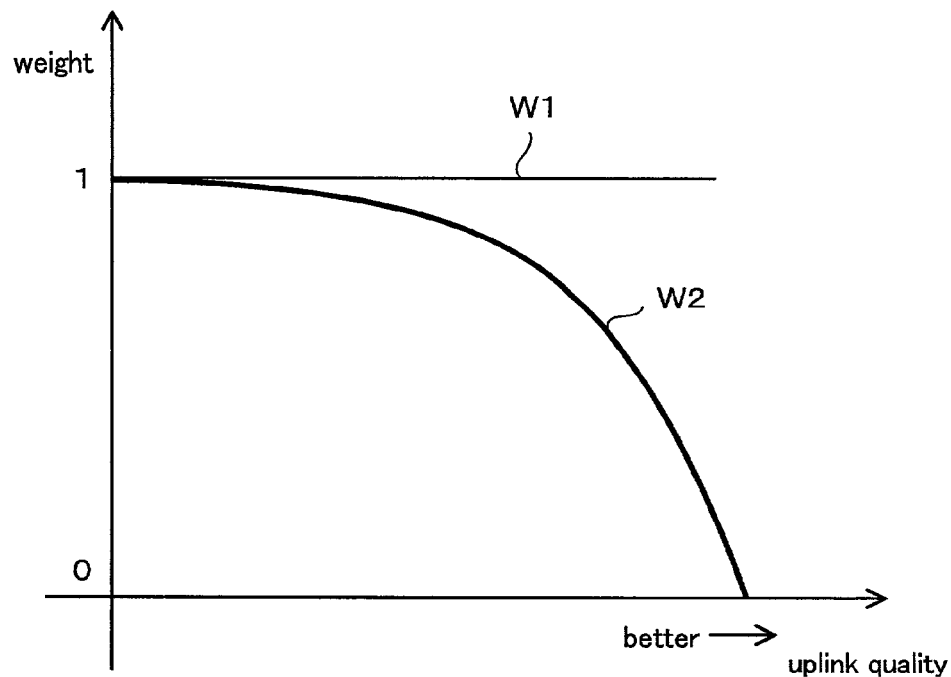
FIG. 5 is a graph showing an example of the relation between uplink channel quality and weights, which is used to determine weighting.

For example, when applying weights, adjustment circuit 38 sets a weight of "1" for the base station that has been selected by base station selector 22. Adjustment circuit 38 also sets a weight of "1" for a base station that has not been selected if its uplink channel quality is below a prescribed threshold, and sets a weight of "0" for a non-selected base station if its uplink channel quality is equal to or above the threshold. Alternatively, as shown in FIG. 5, adjustment circuit 38 sets a weight W1 for the selected base station and changes weight W2, the weight set for non-selected base stations, from "0" to "1" in accordance with the quality of the uplink channel.

Downlink reception quality measuring circuit 24 combines the signals from the base stations after taking into consideration the weights that have been decided by downlink signal weight decision circuit 23, and measures the reception quality of the combined signal, i.e., measures the downlink reception quality.

Figure 6:
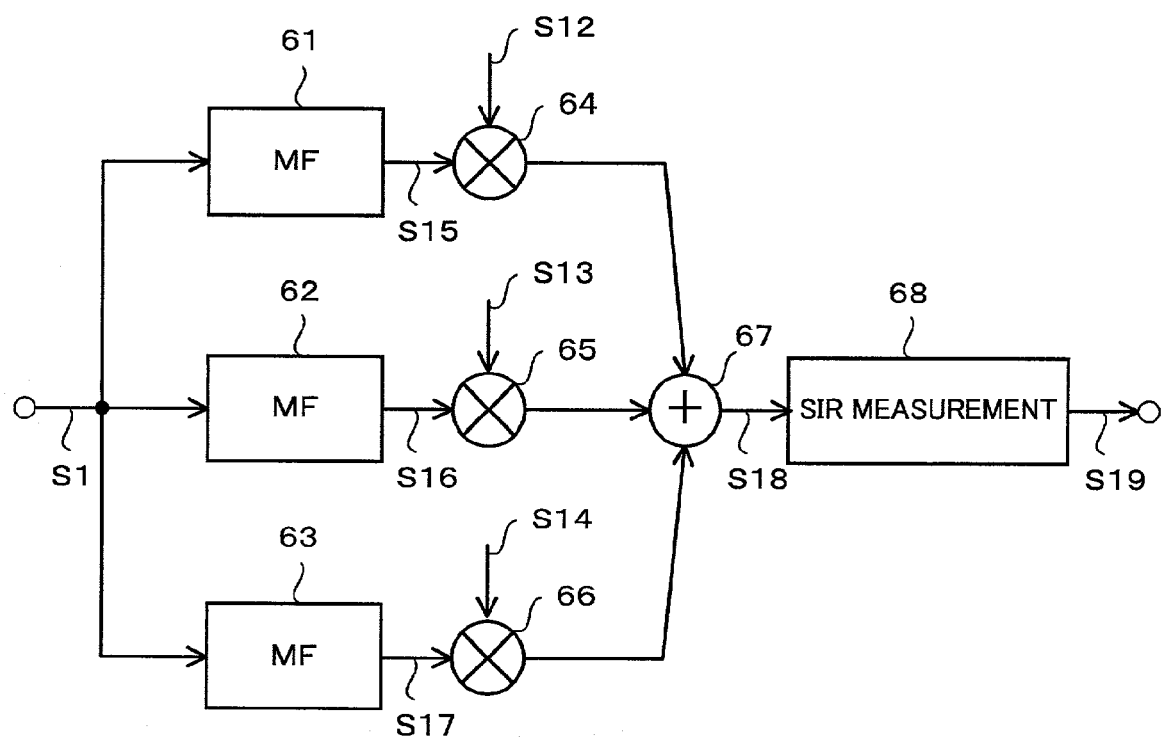
FIG. 6 is a block diagram showing the constitution of the downlink reception quality measuring circuit in this embodiment.

Referring to FIG. 6, downlink reception quality measuring circuit 24 comprises matched filters 61, 62 and 63, multipliers 64, 65 and 66, adder 67 and SIR measuring circuit 68.

Matched filters 61, 62 and 63 use prescribed spreading codes to demodulate, from signal S1, the downlink signal from the base stations, and input the demodulated signals to multipliers 64, 65 and 66 as signals S15, S16 and S17 respectively.

Multipliers 64, 65 and 66 respectively multiply weight-indicating signals S12, S13 and S14 that have been respectively input to these multipliers from downlink signal weight decision circuit 23, and signals S15, S16 and S17 that have been input to the multipliers from matched filters 61, 62 and 63 respectively.

Adder 67 adds the outputs of multipliers 64, 65 and 66 and inputs the result to SIR measuring circuit 68 as signal S18.

SIR measuring circuit 68 measures the signal-to-interference power ratio of signal S18 and outputs the measurement result, which is the downlink reception quality, as signal S19.

Downlink TPC command decision circuit 25 decides whether transmission power is excessive or insufficient on the basis of the downlink reception quality as measured by downlink reception quality measuring circuit 24; decides whether the transmission power of the base stations should be increased or decreased; and outputs a TPC command indicative of this decision as signal S11. For example, downlink TPC command decision circuit 25 outputs a TPC command instructing base stations to increase their transmission power when the downlink reception quality is smaller than a prescribed threshold, and outputs a TPC command instructing base stations to decrease their transmission power when the downlink reception quality is equal to or exceeds the threshold.

Multiplexer 26 multiplexes uplink data signal S20 input from terminal 28, base station ID indicating signal S3 input from base station selector 22 and TPC command indicating signal S11 input from downlink TPC command decision circuit 25, and inputs the multiplexed signal, which is signal S2 having the signal format illustrated in FIG. 11, to circulator 21.

Data demodulator 27 demodulates downlink data from signal S1 and outputs the result to terminal 29.

Figure 7:
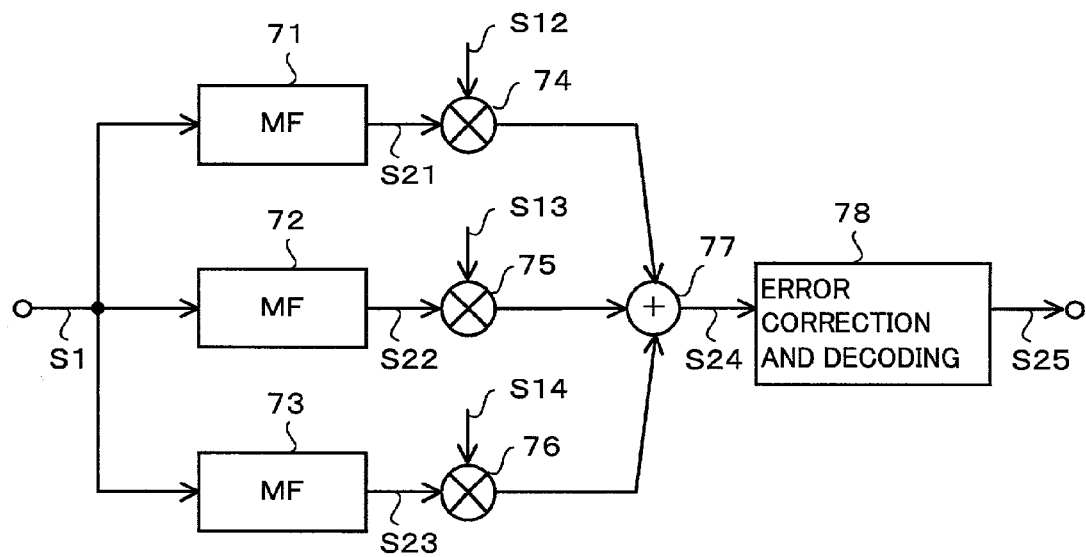
FIG. 7 is a block diagram showing the constitution of the data demodulator in this embodiment.

Referring to FIG. 7, data demodulator 27 comprises matched filters 71, 72 and 73, multipliers 74, 75 and 76, adder 77 and error-correcting decoder 78.

Matched filters 71, 72 and 73 use prescribed spreading codes to demodulate, from signal S1, the signals from the respective base stations, and input the demodulated signals to multipliers 74, 75 and 76 as signals S21, S22 and S23 respectively.

Multipliers 74, 75 and 76 multiply weight-indicating signals S12, S13 and S14 that have been respectively input to these multipliers from downlink signal weight decision circuit 23, and signals S21, S22 and S23 that have been input to the multipliers from matched filters 71, 72 and 73 respectively.

Adder 77 adds the outputs of multipliers 74, 75 and 76 and inputs the result to error-correcting decoder 78 as signal S24.

Error-correcting decoder 78 applies error correction and decoding to signal S24 to decode the downlink data, and outputs the result as signal S25.

The operation of the downlink transmission power control in the CDMA mobile communications system of this embodiment will now be described.

Firstly, the operation of mobile terminal 13 will be described.

First of all, mobile terminal 13 uses base station selector 22 to measure the propagation characteristics of the common pilot channel from each base station, and to select the base station with the best common pilot channel propagation characteristics. The ID of the selected base station is communicated to each base station.

Next, mobile terminal 13 uses downlink signal weight decision circuit 23 to decide, from the power of the signal received from each base station, the TPC command, and the base station ID from base station selector 22, the weights to be applied to the signal received from each base station, in accordance with the likelihood with which each base station transmits downlink data.

Next, mobile terminal 13 uses downlink reception quality measuring circuit 24 to combine the signals from the base stations after taking into consideration the weights that have been decided by downlink signal weight decision circuit 23, and to measure the reception quality of this combined signal, i.e., to measure the downlink reception quality.

Next, mobile terminal 13 uses downlink TPC command decision circuit 25 to output, on the basis of the downlink reception quality as measured by downlink reception quality measuring circuit 24, a TPC command instructing either an increase or a decrease of base station transmission power. The TPC command is communicated to the base stations and is also input to downlink signal weight decision circuit 23.

The weights decided by downlink signal weight decision circuit 23 are also input to data demodulator 27. Mobile terminal 13 uses data demodulator 27 to combine the signals from the base stations after taking these weights into consideration, and to apply error-correction to the combined signal, which is then used as the received data.

The operation of a base station will now be described.

When a base station receives notification of a base station ID from a mobile terminal, it decides whether or not the received base station ID matches its own ID, and if it does it transmits downlink data via the DPDCH. If the base station ID that has been communicated from mobile terminal 13 does not match its own ID, the base station does not transmit any signal in the DPDCH.

A base station transmits control signals via the DPCCH irrespective of the base station ID that has been communicated from mobile terminal 13.

A base station increases or decreases its transmission power in the DPDCH when it receives an instruction via a TPC command from mobile terminal 13.

According to this embodiment, because downlink transmission power is controlled by means of the signal obtained by weighting and combining the downlink signals from base stations that have been estimated to have a likelihood of transmitting via the DPDCH, the transmission power of the DPDCH from each base station can be more adequately controlled and interference with the downlink signal to other mobile terminals can be decreased.

In addition, because downlink data is demodulated by means of the signal obtained by combining the signals received from base stations that have been estimated to have a likelihood of transmitting via the DPDCH, downlink DPDCH signals are effectively utilized.

Another embodiment of this invention will now be described.

Figure 8:
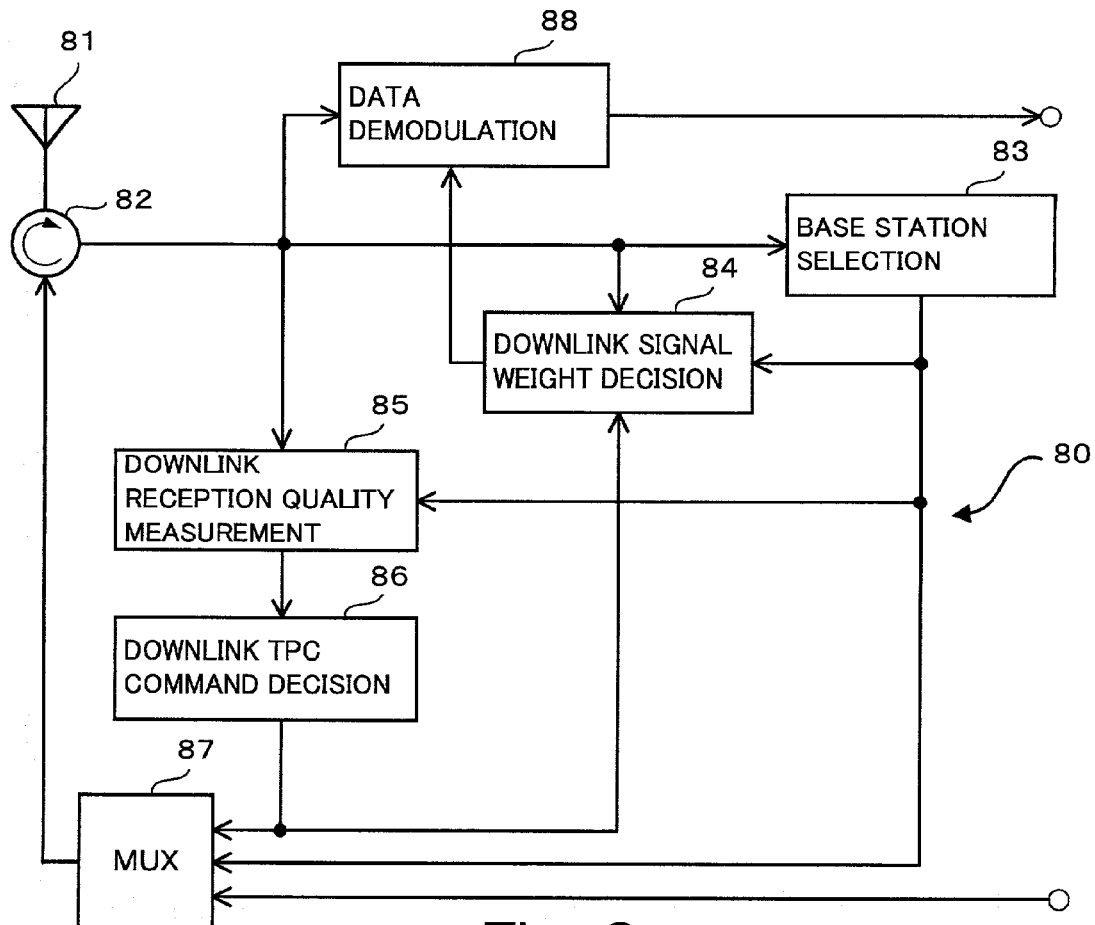
FIG. 8 is a block diagram showing the constitution of the mobile terminal in another embodiment of this invention.
Figure 9:
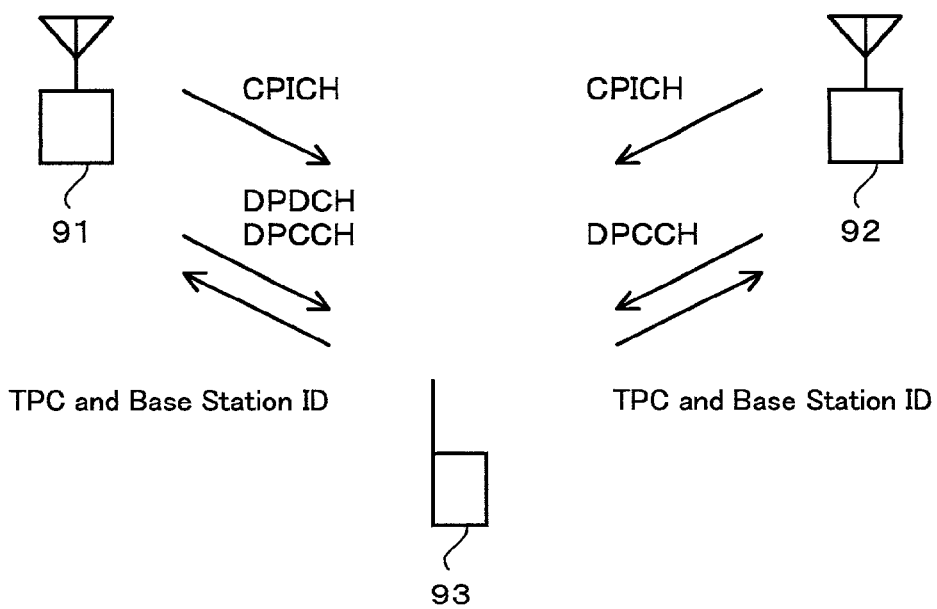
FIG. 9 is a conceptual diagram serving to outline a conventional transmission power control method with base station selection in a CDMA mobile communications system.

In FIG. 8, mobile terminal 80 of this other embodiment of the invention comprises antenna 81, circulator 82, base station selector 83, downlink signal weight decision circuit 84, downlink reception quality measuring circuit 85, downlink TPC command decision circuit 86, multiplexer 87 and data demodulator 88.

Antenna 81, circulator 82, base station selector 83, downlink signal weight decision circuit 84, downlink TPC command decision circuit 86, multiplexer 87 and data demodulator 88 are respectively the same as antenna 20, circulator 21, base station selector 22, downlink signal weight decision circuit 23, downlink TPC command decision circuit 25, multiplexer 26 and data demodulator 27 shown in FIG. 2.

Figure 12:
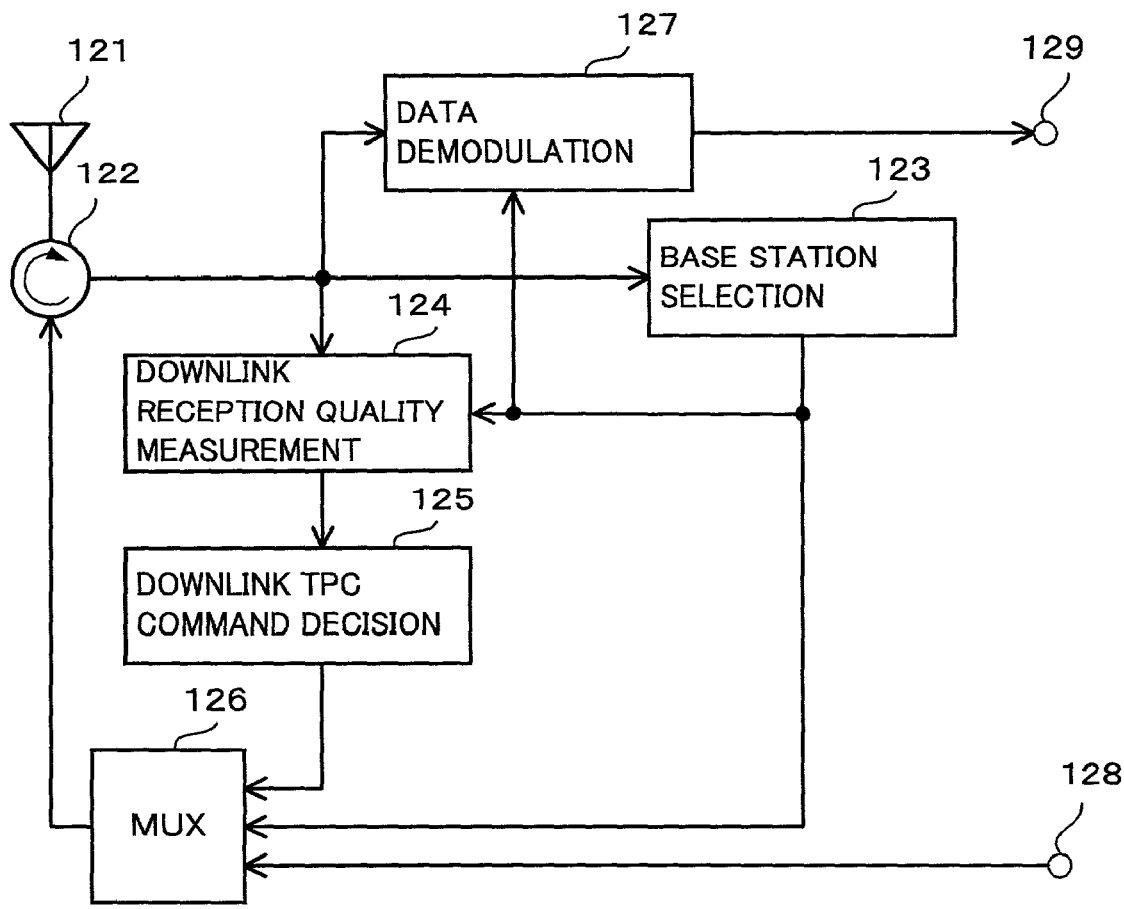
FIG. 12 is a block diagram showing an example of the constitution of a conventional mobile terminal.
Figure 13:
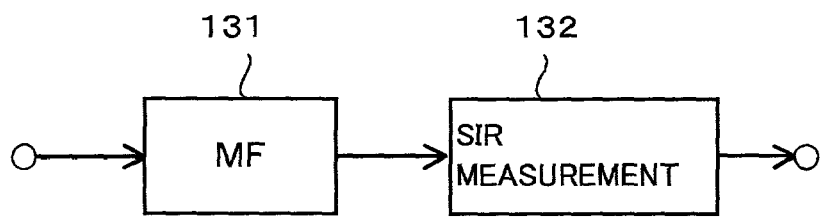
FIG. 13 is a block diagram showing an example of the constitution of a conventional downlink reception quality measuring circuit.
Figure 14:
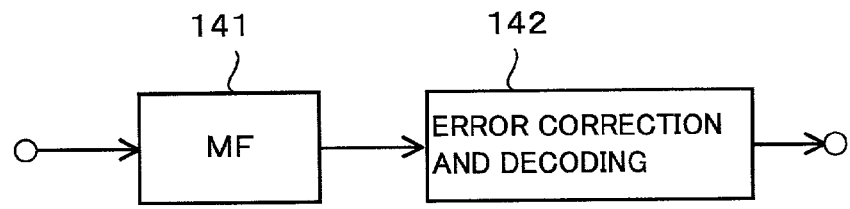
FIG. 14 is a block diagram showing an example of the constitution of a conventional data demodulator.
Figure 15:
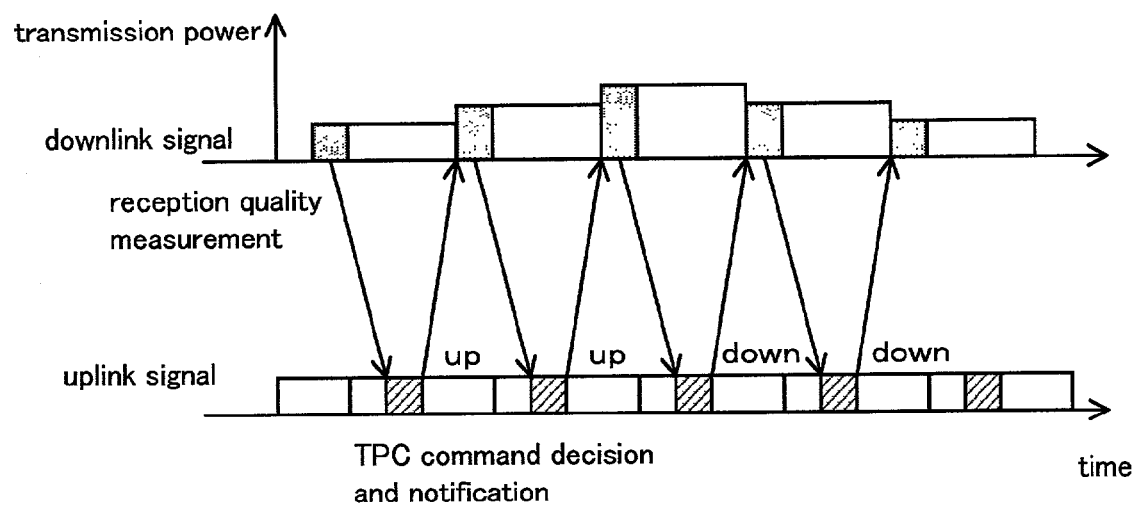
FIG. 15 serves to explain conventional transmission power control for the downlink dedicated physical channels.
Figure 16:
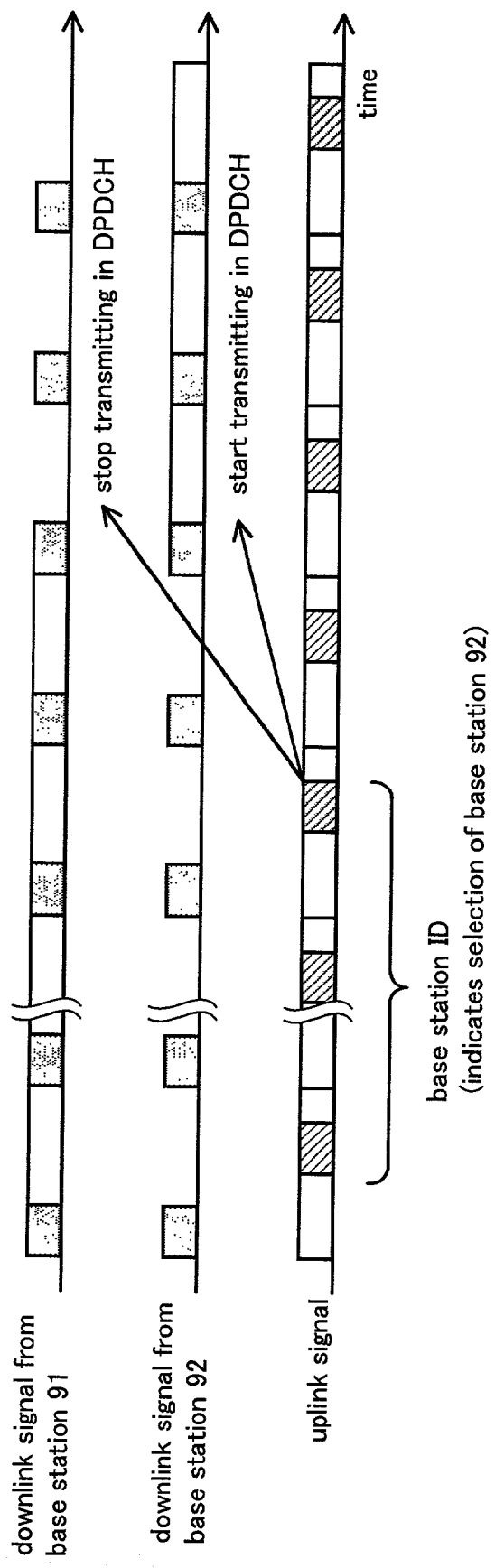
FIG. 16 serves to explain conventional transmission control by base station selection using base station ID.

Downlink reception quality measuring circuit 85 is the same as conventional downlink reception quality measuring circuit 124 shown in FIG. 12, and measures the reception quality of the downlink signal from the base station that has been selected by base station selector 83.

The weights decided by downlink signal weight decision circuit 84 are used only when data demodulator 88 demodulates the downlink data after combining the signals received from the base stations.

With the embodiment depicted in FIG. 8, because downlink data is demodulated by means of the signal obtained by weighting and combining the downlink signals from base stations that have been estimated to have a likelihood of transmitting via the DPDCH, the reception quality at mobile terminal 80 is improved.

According to this invention, because even user data transmitted from base stations that were not selected by a mobile terminal can be utilized for controlling transmission power, interference with the downlink signal to other mobile terminals is decreased and downlink user data signals are effectively utilized.

Moreover, with this invention, user data that has been transmitted from base stations that have not been selected by a mobile terminal is utilized for the downlink data demodulation, with the result that the downlink reception quality at the mobile terminal is improved.

What is claimed is:

1. A transmission power control method for controlling transmission power of downlink signals from base stations to a mobile terminal in a mobile communications system, comprising the steps of:

selecting, at the mobile terminal, a first base station, said first base station transmitting user data in a downlink signal with a preferred reception quality;

transmitting, from the mobile terminal, identification of the selected first base station to the first base station and other base stations not selected by said mobile terminal;

determining, at the mobile terminal, a likelihood of transmission power of downlink signals from the selected first base station and the other base stations not selected by said mobile terminal, said other base stations transmitting user data in said downlink signals to the mobile terminal after the identification of the selected first base station is transmitted;

determining weights for each of the other base stations based on a degree of likelihood of transmitting downlink user data; and sending information, from the mobile terminal to the selected first base station and the other base stations, to modify the transmission power of the downlink signals of the selected first base station and the other base stations based on the determined likelihood of transmission power of the downlink signals from said selected first base station and said other base stations not selected by said mobile terminal such that the downlink signals from the other base stations are individually weighted based on the determined weights to produce weighted downlink signals, wherein said other base stations terminate transmission of user data to said mobile terminal if said identification, which is transmitted by said mobile terminal, is properly received at the other base stations, and said other base stations continue to transmit user data after said selecting of the first base station if said identification of the selected first base station transmitted by said mobile terminal is not properly received at the other base stations, wherein said other base stations transmit user data to said mobile terminal prior to the selecting of said first base station, and said other base stations do not properly receive said identification of the selected first base station and continue to transmit without terminating transmission of user data, wherein the information sent from the mobile terminal to the selected first base station and the other base stations to modify the transmission power of the downlink signals of the selected first base station and the other base stations is transmitted while the first base station is selected as transmitting user data with the preferred reception quality.

2. A transmission power control method according to claim 1, wherein the step of determining the likelihood of the transmission power of downlink signals comprises estimating uplink reception quality of said other base stations.

3. A transmission power control method according to claim 2, wherein the weights are determined for the downlink signals from said other base stations based on the uplink reception quality.

4. A transmission power control method according to claim 2, wherein said estimating comprises calculating a correlation between an increase or decrease in transmission power instructed by a transmission power control, and an increase or decrease in transmission power of a downlink signal received from a base station that is transmitting user data to the mobile terminal after the first base station is selected, wherein said correlation is calculated based on a difference of the increase or decrease of the transmission power instructed and the increase or decrease in the transmission power of the downlink signal received.

5. A transmission power control method according to claim 1, wherein a signal obtained by combining the weighted downlink signals from the selected first base station and said other base stations is used to determine whether the transmission power of downlink signals from the selected base station and the other base stations is excessive or insufficient.

6. A receiving method for demodulating user data in a downlink signal from base stations to a mobile terminal in a mobile communications system, comprising the steps of:

selecting, at the mobile terminal, a first base station, said first base station transmitting user data in a downlink signal having a preferred reception quality;

transmitting, from the mobile terminal, identification of the selected first base station to the first base station and other base stations not selected by said mobile terminal; and using downlink signals from said other base stations not selected by said mobile terminal, said other base stations transmitting user data after the identification of the selected first base station is transmitted, to demodulate, at the mobile terminal, user data from said selected first base station by combining the downlink signal of the selected first base station and the downlink signals from said other base stations not selected by said mobile terminal, wherein said other base stations terminate transmission of user data to said mobile terminal if said identification, which is transmitted by said mobile terminal, is properly received at the other base stations, and said other base stations continue to transmit user data after said selecting of the first base station if said identification of the selected first base station transmitted by said mobile terminal is not properly received at the other base stations, wherein said other base stations transmit user data to said mobile terminal prior to the selecting of said first base station, and said other base stations do not properly receive said identification of the selected first base station and continue to transmit without terminating transmission of user data, wherein said step of using comprises determining an estimated uplink reception quality of said other base stations based on measuring, at the mobile terminal, transmission powers of each of the downlink signals from the other base stations, wherein the user data from the selected first base station is demodulated by combining the downlink signal of the selected first base station and the downlink signals from said other base stations not selected by said mobile terminal such that the downlink signals from the other base stations are individually weighted based on the estimated uplink reception quality and combined with the downlink signal of the selected first base station while the first base station is selected as transmitting user data having the preferred reception quality.

7. A receiving method according to claim 6, wherein signal weights are determined for the downlink signals from said other base stations based on the uplink reception quality.

8. A receiving method according to claim 6, wherein said estimating comprises calculating a correlation between an increase or decrease in transmission power instructed by a transmission power control, and an increase or decrease in transmission power of a downlink signal received from a base station that is transmitting user data to the mobile terminal after the first base station is selected, wherein said correlation is calculated based on a difference of the increase or decrease of the transmission power instructed and the increase or decrease in the transmission power of the downlink signal received.

9. A receiving method according to claim 6, wherein a signal obtained by combining weighted downlink signals from the other base stations is used for demodulating the user data from said first base station.

10. A mobile terminal that controls transmission power of downlink signals from base stations in a mobile communications system, comprising:

base station selecting means for selecting a first base station that is transmitting user data in a downlink signal with a preferred reception quality;

transmission means for transmitting, from the mobile terminal, identification of the selected first base station to the first base station and other base stations not selected by said mobile terminal;

downlink signal weight decision means for determining a likelihood of transmission power of downlink signals from the selected first base station and the other base stations not selected by said mobile terminal and determining weights for each of the other base stations based on a degree of likelihood of transmitting downlink user data, said other base stations transmitting user data in said downlink signals to the mobile terminal after the identification of the selected first base station is transmitted; and downlink TPC command decision means for using the downlink signals from said other base stations, to decide whether transmission power of selected first base station and said other base stations is excessive or insufficient, and to instruct an increase or decrease of said transmission power based on the determined transmission power of the downlink signals from said selected first base station and said other base stations not selected by said mobile terminal by transmitting information from the mobile terminal such that the downlink signals from the other base stations are individually weighted based on the determined weights to produce weighted downlink signals, wherein said other base stations terminate transmission of user data to said mobile terminal if said identification, which is transmitted by said mobile terminal, is properly received at the other base stations, and said other base stations continue to transmit user data after said selecting of the first base station if said identification of the selected first base station transmitted by said mobile terminal is not properly received at the other base stations, wherein said other base stations transmit user data to said mobile terminal prior to the selecting of said first base station, and said other base stations do not properly receive said identification of the selected first base station and continue to transmit without terminating transmission of user data, wherein the information sent from the mobile terminal to the selected first base station and the other base stations to modify the transmission power of the downlink signals of the selected first base station and the other bases stations is transmitted while the first base station is selected as transmitting user data with the preferred reception quality.

11. A mobile terminal for receiving user data in the downlink signal from base stations in a mobile communications system, comprising:

base station selecting means for selecting a first base station that is transmitting user data in a downlink signal with a preferred downlink reception quality;

transmission means for transmitting, from the mobile terminal, identification of the selected first base station to the first base station and other base stations not selected by said mobile terminal;

downlink signal weight decision means for determining a likelihood of transmission power of downlink signals from said other base stations not selected by said mobile terminal, said other base stations transmitting user data in said downlink signals to the mobile terminal after the identification of the selected first base station is transmitted; and data demodulating means for using downlink signals from said other base stations, to demodulate user data from said first base station by combining the downlink signal of the selected first base station and the downlink signals from said other base stations not selected by said mobile terminal, wherein said other base stations terminate transmission of user data to said mobile terminal if said identification, which is transmitted by said mobile terminal, is properly received at the other base stations, and said other base stations continue to transmit user data after said selecting of the first base station if said identification of the selected first base station transmitted by said mobile terminal is not properly received at the other base stations, wherein said other base stations transmit user data to said mobile terminal prior to the selecting of said first base station, and said other base stations do not properly receive said identification of the selected first base station and continue to transmit without terminating transmission of user data, wherein said data demodulation means determines an estimated uplink reception quality of said other base stations based on measuring, at the mobile terminal, transmission powers of each of the downlink signals from the other base stations, wherein the user data from the selected first base station is demodulated by combining the downlink signal of the selected first base station and the downlink signals from said other base stations not selected by said mobile terminal such that the downlink signals from the other base stations are individually weighted based on the estimated uplink reception quality and combined with the downlink signal of the selected first base station while the first base station is selected as transmitting user data having the preferred reception quality.

12. A mobile terminal according to claim 10, wherein said downlink signal weight decision means estimates uplink reception quality of said other base stations.

13. A mobile terminal according to claim 12, wherein the weights are determined for the downlink signals from said other base stations based on the uplink reception quality.

14. A mobile terminal according to claim 12, wherein the downlink signal weight decision means calculates an estimated uplink reception quality from a correlation between an increase or decrease in transmission power instructed by a transmission power control, and an increase or decrease in power of a downlink signal received from a base station that is transmitting user data to the mobile terminal after the first base station is selected, wherein said correlation is calculated based on a difference of the increase or decrease of the transmission power instructed and the increase or decrease in the transmission power of the downlink signal received.

15. A mobile terminal according to claim 10, wherein the downlink TPC command decision means uses a signal obtained by combining the weighted downlink signals from said other base stations to decide whether transmission power of the other base stations is excessive or insufficient.

16. A mobile terminal according to claim 11, wherein said data demodulating means uses a signal obtained by combining weighted downlink signals from said other base stations to demodulate the user data.

17. A transmission power control method according to claim 1, wherein said other base stations not selected by the mobile terminal, which do not properly receive said identification of the selected first base station and continue to transmit without terminating transmission of user data, transmit user data to the mobile terminal in a downlink dedicated physical channel and transmit pilot data in a downlink dedicated control channel after the identification of the selected first base station is transmitted.

18. A receiving method according to claim 6, wherein said other base stations not selected by the mobile terminal, which do not properly receive said identification of the selected first base station and continue to transmit without terminating transmission of user data, transmit user data to the mobile terminal in a downlink dedicated physical channel and transmit pilot data in a downlink dedicated control channel after the identification of the selected first base station is transmitted.

19. A mobile terminal according to claim 10, wherein said other base stations not selected by the mobile terminal, which do not properly receive said identification of the selected first base station and continue to transmit without terminating transmission of user data, transmit user data to the mobile terminal in a downlink dedicated physical channel and transmit pilot data in a downlink dedicated control channel after the identification of the selected first base station is transmitted.

20. A mobile terminal according to claim 11, wherein said other base stations not selected by the mobile terminal, which do not properly receive said identification of the selected first base station and continue to transmit without terminating transmission of user data, transmit user data to the mobile terminal in a downlink dedicated physical channel and transmit pilot data in a downlink dedicated control channel after the identification of the selected first base station is transmitted.

21. A transmission power control method according to claim 1, wherein the information sent from the mobile terminal to the selected first base station and the other base stations is a transmission power control signal that is determined based on measuring transmission powers of downlink signals from the selected first base station and the other base stations together while the first base station is selected, wherein each of the selected first base station and the other base stations adjust respective transmission powers in response to receiving the transmission power control signal.

22. A mobile terminal according to claim 10, wherein the information sent from the mobile terminal to the selected first base station and the other base stations is a transmission power control signal that is determined based on measuring transmission powers of downlink signals from the selected first base station and the other base stations together while the first base station is selected, wherein each of the selected first base station and the other base stations adjust respective transmission powers in response to receiving the transmission power control signal.

23. A mobile terminal according to claim 11, wherein signal weights are determined for the downlink signals from said other base stations based on the uplink reception quality.

24. A mobile terminal according to claim 11, wherein the downlink signal weight decision means calculates an estimated uplink reception quality from a correlation between an increase or decrease in transmission power instructed by a transmission power control, and an increase or decrease in power of a downlink signal received from a base station that is transmitting user data to the mobile terminal after the first base station is selected, wherein said correlation is calculated based on a difference of the increase or decrease of the transmission power instructed and the increase or decrease in the transmission power of the downlink signal received.

* * * * *